United States Patent
Kommrusch et al.

(10) Patent No.: US 10,642,336 B2
(45) Date of Patent: May 5, 2020

(54) CLOCK ADJUSTMENT FOR VOLTAGE DROOP

(71) Applicant: Advanced Micro Devices, Inc., Sunnyvale, CA (US)

(72) Inventors: Steven Kommrusch, Fort Collins, CO (US); Amitabh Mehra, Fort Collins, CO (US); Richard Martin Born, Fort Collins, CO (US); Bobby D. Young, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 155 days.

(21) Appl. No.: 15/208,388

(22) Filed: Jul. 12, 2016

(65) Prior Publication Data

US 2018/0018009 A1    Jan. 18, 2018

(51) Int. Cl.
| | |
|---|---|
| *G06F 1/32* | (2019.01) |
| *G06F 1/324* | (2019.01) |
| *G06F 1/30* | (2006.01) |
| *G06F 1/26* | (2006.01) |

(52) U.S. Cl.
CPC .............. *G06F 1/324* (2013.01); *G06F 1/305* (2013.01); *G06F 1/26* (2013.01); *Y02D 10/126* (2018.01)

(58) Field of Classification Search
CPC .................................... G06F 1/32; G06F 1/26
See application file for complete search history.

(56) References Cited

U.S. PATENT DOCUMENTS

| | | | | |
|---|---|---|---|---|
| 5,814,972 | A  * | 9/1998 | Shimada | H02J 9/061 320/132 |
| 6,370,643 | B1 * | 4/2002 | Kubo | G06F 1/24 307/85 |
| 7,007,188 | B1 | 2/2006 | Tischler et al. | |
| 7,076,679 | B2 * | 7/2006 | Fischer | G06F 1/08 713/400 |
| 8,933,737 | B1 * | 1/2015 | Chatterjee | H03L 7/095 327/149 |
| 9,317,342 | B2 * | 4/2016 | Dighe | G06F 9/4893 |
| 10,009,016 | B1 * | 6/2018 | Ho | G06F 1/10 |

(Continued)

FOREIGN PATENT DOCUMENTS

| | | |
|---|---|---|
| WO | 2013078311 A1 | 5/2013 |
| WO | 2016105643 A1 | 6/2016 |

OTHER PUBLICATIONS

International Search Report and Written Opinion dated Apr. 12, 2017 in PCT Application No. PCT/US2016/051814, 14 pages.

(Continued)

*Primary Examiner* — Phil K Nguyen

(57) ABSTRACT

A processor adjusts frequencies of one or more clock signals in response to a voltage droop at the processor. The processor generates at least one clock signal by generating a plurality of base clock signals, each of the base clock signals having a common frequency but a different phase. The processor also generates a plurality of enable signals, wherein each enable signal governs whether a corresponding one of the base clock signals is used to generate the clock signal. The enable signals therefore determine the frequency of the clock signal. In response to detecting a voltage droop, the processor adjusts the enable signals used to generate the clock signal, thereby reducing the frequency of the clock signal droop.

16 Claims, 4 Drawing Sheets

(56) References Cited

U.S. PATENT DOCUMENTS

| | | | |
|---|---|---|---|
| 10,171,081 B1* | 1/2019 | Bose | H03K 19/00361 |
| 2003/0126377 A1* | 7/2003 | Orenstien | G06F 1/3203 |
| | | | 711/146 |
| 2004/0119521 A1* | 6/2004 | Kurd | G06F 1/10 |
| | | | 327/291 |
| 2004/0183613 A1 | 9/2004 | Kurd et al. | |
| 2005/0022042 A1* | 1/2005 | Tam | G06F 1/04 |
| | | | 713/323 |
| 2005/0110545 A1* | 5/2005 | Mahrla | G06F 1/10 |
| | | | 327/165 |
| 2006/0206746 A1* | 9/2006 | Yamada | G06F 1/30 |
| | | | 713/600 |
| 2009/0138748 A1* | 5/2009 | Kim | G06F 1/08 |
| | | | 713/503 |
| 2011/0264952 A1* | 10/2011 | Heinrichs | G06F 1/30 |
| | | | 714/14 |
| 2012/0169373 A1 | 7/2012 | Langadi | |
| 2012/0187991 A1 | 7/2012 | Sathe et al. | |
| 2013/0318364 A1* | 11/2013 | Berry, Jr. | G06F 1/26 |
| | | | 713/300 |
| 2014/0254734 A1 | 9/2014 | Abdelmoneum et al. | |
| 2015/0002197 A1 | 1/2015 | Chatterjee et al. | |
| 2016/0179163 A1 | 6/2016 | Haider et al. | |
| 2017/0038789 A1 | 2/2017 | Pal et al. | |
| 2017/0038814 A1 | 2/2017 | Pal | |
| 2017/0300080 A1 | 10/2017 | Jain et al. | |
| 2018/0091125 A1 | 3/2018 | Carlson et al. | |

OTHER PUBLICATIONS

European Search Report dated Jun. 16, 2017 in EP Application No. 16201253.8, 4 pages.
Examination Report dated Jul. 11, 2017 for EP Application No. 16 201 253.8, 12 pages.
Summons to attend oral proceedings pursuant to Rule 1151(1) EPC dated Feb. 15, 2018 for European Application No. 16201253.8, 14 pages.
U.S. Appl. No. 15/441,613, filed Feb. 24, 2017 lisiting Deepesh John as first inventor, entitled, "Clock Divider Device and Methods Thereof,", 40 pages.
International Search Report and Written Opinion for PCT Application No. PCT2018018718, 14 pages.
Notice of Allowance dated Jan. 30, 2019 for U.S. Appl. No. 15/441,613, 5 pages.
Non-Final Office Action dated Sep. 19, 2018 for U.S. Appl. No. 15/441,613, 41 pages.
International Preliminary Report on Patentability dated Jan. 24, 2019 for International Application No. PCT/US2016/051814, 11 pages.
International Preliminary Report on Patentability dated Sep. 6, 2019 for International Application No. PCT/US2018/018718, 11 pages.

* cited by examiner

US 10,642,336 B2

CLOCK ADJUSTMENT FOR VOLTAGE DROOP

BACKGROUND

Description of the Related Art

A processor typically employs one or more clock signals to synchronize logic operations at modules of the processor, thereby preventing errors such as setup errors, race conditions, and the like. The maximum clock frequency that can be applied to a module depends at least in part on a supply voltage provided to the module that governs voltage thresholds for transistors of the module. However, a processor module sometimes experiences temporary reductions, referred to as voltage droops, in the supply voltage. Failure to adjust the clock frequency for the module can cause errors in the overall operation of the processor. Some processors account for voltage droop by generating a "spare" clock signal at a reduced frequency relative to a nominal clock frequency of the module clock signal, and in response to detecting a voltage droop temporarily replace the module clock signal with the spare clock signal. However, replacement of the clock signal can cause operational errors during the replacement, and can require complex circuitry to implement.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 disclose techniques for adjusting frequencies of one or more clock signals at a processor in response to a voltage droop at the processor. The processor generates at least one clock signal by generating a plurality of base clock signals, each of the base clock signals having a common frequency but a different phase. The processor also generates a plurality of enable signals, wherein each enable signal governs whether a corresponding one of the base clock signals is used to generate the clock signal. The enable signals therefore determine the frequency of the clock signal. In response to detecting a voltage droop, the processor adjusts the enable signals used to generate the clock signal, thereby "stretching", or reducing the frequency of, the clock signal and reducing errors resulting from the voltage droop.

Figure 1:
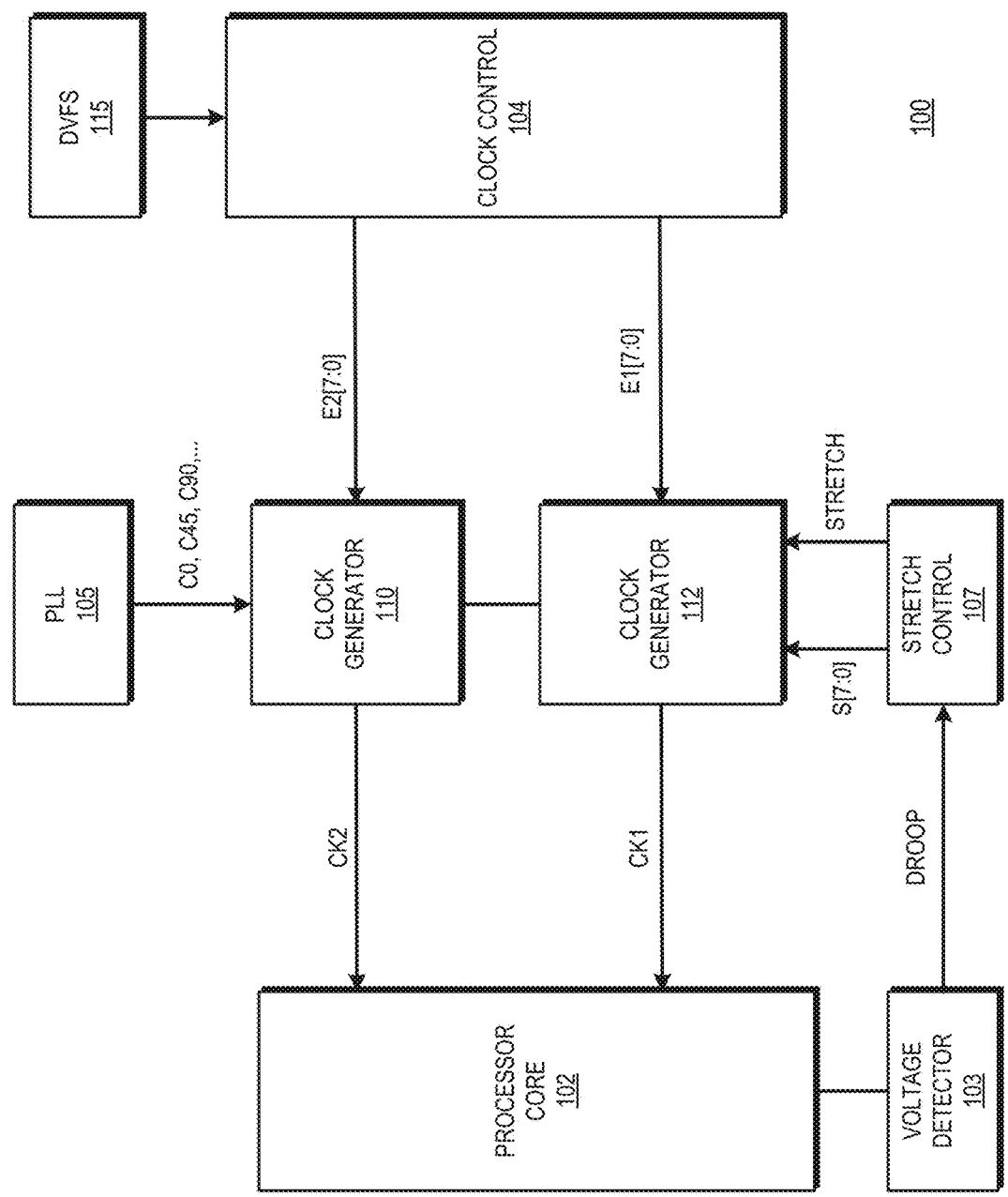
FIG. 1 is a block diagram of a processor that adjusts a clock signal in response to a voltage droop by adjusting enable signals used to generate the clock signal in accordance with some embodiments.

FIG. 1 illustrates a processor 100 that adjusts a clock signal in response to a voltage droop in accordance with some embodiments. The processor 100 can be implemented by any of a variety of compute-enabled electronic devices, such as a server, a desktop computer, a notebook computer, a tablet computer, a compute-enabled portable cellular phone (e.g., a "smart phone"), a compute-enabled watch or other wearable item, a personal digital assistant (PDA), a gaming console, and the like. In the depicted example, the processor 100 includes a processor core 102, a voltage detector 103, a clock control module 104, a phase-locked loop (PLL) 105, a stretch control module 107, clock generators 110 and 112, and a digital voltage and frequency scaling (DVFS) module 115.

The processor core 102 is generally configured to execute sets of instructions (e.g., computer programs) to carry out operations on behalf of an electronic device. To execute the sets of instructions, the processor core includes one or more modules, such as fetch stages, dispatch stages, execution units, memory controllers, input/output interfaces, caches, and the like that are each composed of synchronous logic elements, logic gates, and other components. To synchronize operation of these components, the processor core 102 employs one or more clock signals. In the depicted example, the processor core 102 employs two different clock signals, designated "CK1" and "CK2" to synchronize its operations. In some embodiments, the clock signals CK1 and CK2 can concurrently be at different frequencies, and can be used to synchronize different modules of the processor core 102, or different operations of a module.

To generate the clock signals CK1 and CK2, the processor 100 employs the PLL 105 in conjunction with the clock control module 104 and the clock generators 110 and 112. The clock control module 104 is generally configured to identify a frequency for the clock signals CK1 and CK2 based on any of a number of criteria. In the example of processor 100, the DVFS module 115 is configured to supply frequency information for the clock signals CK1 and CK2 based on operating conditions for the processor 100. For example, in some embodiments the DVFS module 115 receives power mode information for the processor 100, the power mode information indicating a selection of one of a plurality of power states. The power mode information can, for example, be supplied by an operating system executing at the processor core 102, based on information supplied by a performance monitor (not shown) of the processor 100 based on performance characteristics of the processor core 102, and the like. Based on the power mode information, the DVFS module 115 selects a voltage to be supplied to the processor core 102 to be used as a reference voltage for one or more modules of the processor core 102. In addition, based on the power mode the DVFS module 115 supplies frequency information to the clock control module 104, indicating the frequencies for the clock signals CK1 and CK2 corresponding to the selected power state. Based on the frequency information, the clock control module 104 generates enable signals designated E1[7:0] and E2[7:0] to set the frequencies for the clock signals CK1 and CK2, as described further herein.

The PLL 105 is configured to receive a reference clock signal (not shown) from a crystal oscillator (not shown) or other clock source and based on the reference clock signal generate a plurality of base clock signals, wherein each base clock signal is out of phase with the others. In the example of processor 100, it is assumed that the PLL 105 generates eight base clock signals, designated C0, C45, C90, C135, C180, C225, C270, and C315, and collectively referred to as C0-C315. Each of the base clock signals C0-C315 is at least forty-five degrees out of phase with the other base clock signals. In particular, the base clock signal C45 is forty-five degrees out of phase with the base clock signal C0, the base clock signal C90 is ninety degrees out of phase with the base clock signal C0, the base clock signal C135 is one-hundred thirty-five degrees out of phase with the base clock signal C0, and so on, with the number in the clock signal designation indicating the number of degrees the clock signal is out of phase with the clock signal C0.

The clock generators 110 and 112 are each configured to receive a set of enable signals and the base signals C0-C315 and, based on the received enable signals, combine the base signals C0-C315 to generate the respective output clock signal at a frequency based on the enable signals. Thus, for example, the clock generator 112 is configured to receive the enable signals E1[7:0] and based on the enable signals combine the base clock signals C0-C315 to generate the clock signal CK1 at a frequency based on the enable signals E1[7:0]. In some embodiments, each of the enable signals E1[7:0] corresponds to a different one of the clock signals C0-C315 and the state of the enable signal indicates whether the corresponding clock signal will be applied to one or more logic gates whose output is used to generate the clock. The clock generator 112 thereby implements a frequency divider with respect to the frequency (referred to as the base frequency) of the base clock signals C0-C315, generating the clock signal C1 to have a frequency that is a fraction of the base frequency, wherein the fraction is controlled, at least in part, by the enable signals E1[7:0]. The clock generator 110 is configured similarly to generate the clock signal CK2 based on the base clock signals C0-C315, but the frequency of the clock signal is controlled in part by the enable signals E2[7:0].

To reduce errors due to voltage droop at the processor core 102, the processor 100 employs the voltage detector 103 and the stretch control module 107. The voltage detector 103 is configured to monitor a supply voltage at one or more locations in the processor core 102. In response to detecting the monitored voltage has fallen by a specified threshold amount, the voltage detector 103 asserts an output signal designated "DROOP", thereby indicating that a voltage droop has been detected at the processor core 102.

The stretch control module 107 is configured to generate two sets of signals in response to assertion of the DROOP signal. In particular, in response to assertion of the DROOP signal, the stretch control module 107 asserts a signal designated "STRETCH" to indicate that one or both of the clock signals CK1 and CK2 should be "stretched", or have their frequencies reduced in response to the voltage droop. In addition, the stretch control module 107 generates a set of stretch enable signals, designated S[7:0]. In some embodiments, each of the stretch enable signals corresponds to either the enable signals E2[7:0] or the enable signals E1[7:0]. In response to assertion of the STRETCH signal, the clock generator 112 replaces the enable signals E1[7:0] with the stretch enable signals S[7:0], thereby changing the frequency of the clock signal CK1 in response to the detected voltage droop. Similarly, in response to assertion of the STRETCH signal, the clock generator 110 replaces the enable signals E2[7:0] with the with the stretch enable signals S[7:0], thus changing the frequency of the clock signal CK2.

In at least one embodiment, the stretch control module 107 is configured to monitor the enable signals E2[7:0] and to generate the stretch enable signals S[7:0] to modify the frequency of the clock signal CK1 by a predetermined amount. Thus, for example, the stretch control module 107 can generate the stretch enable signals such that the frequency of the clock signal CK1 is divided by two, relative to the nominal frequency of the clock signal as set by the enable signals E2[7:0], in response to a voltage droop. In some embodiments, the stretch control module changes the frequency of the clock signal CK1 by a variable amount, depending on the size of the voltage droop indicated by the signal DROOP (or by a plurality of control signals represented by the signal DROOP). Thus, for example, if the voltage droop at the processor core 102 exceeds a first threshold, the stretch control module 107 can set the stretch control signals S[7:0] to divide the frequency the clock signal CK1 by 1.25, relative to the nominal frequency set by the enable signals E1[7:0] and if the voltage droop at the processor core 102 exceeds a second threshold, the stretch control module 107 can set the stretch control signals S[7:0] to divide the frequency the clock signal CK1 by 1.25, relative to the nominal frequency.

After a voltage droop, the voltage detector 103 continues to monitor the voltage at the processor core 102. In response to the monitored voltage returning to its pre-droop level, or moving above a threshold level, the voltage detector 103 negates the DROOP signal. In response, the stretch control module 107 negates the STRETCH signal, causing the clock generator 112 to return to generating the CK1 clock signal based only on the enable signals E1[7:0], and the clock generator 110 to return to generating the CK2 clock signal based only on the enable signals E2[7:0]. That is, the clock signals CK1 and CK2 are returned to their pre-voltage-droop frequencies, as set by the clock control module 104.

As described above, in response to a voltage droop at the processor core 102 the processor 100 reduces the clock frequencies of clock signals applied to the processor core by modifying the enable signals used to generate the clock signals. This allows the processor 100 to adapt the clock frequencies in response to a voltage droop using the same circuitry used to generate the original clock signals, thereby reducing the amount of circuitry needed to adapt to a voltage droop. In addition, by employing the same circuitry used to generate the original clock signals, the processor 100 can ensure that the change in the clock frequency is synchronized with a phase of the original clock signals, allowing the clock frequency to change without requiring suspension of activity at the processor core 102.

It will be appreciated that in some embodiments, the stretch control module 107 can adjust set the frequency for the clock signals CK1 and CK2 to different frequencies, including stretching one of the clock signals while maintaining the other clock signal in an unstretched state. For example, the stretch control module 107 can generate two sets of individually and separately controllable stretch control signals 51[7:0] and S2[7:0]. Further, in some embodiments the processor 100 can include multiple voltage detectors to detect voltage droop at different modules of the processor 100, such as one voltage detector to detect a voltage droop at a processor core and a different voltage detector to detect a voltage droop at a cache. Based on signals provided by the different voltage detectors, the stretch control module 107 can individually and selectively adjust the frequency of different clock signals. For example, stretching a clock signal supplied to a cache in response to the corresponding voltage detector detecting a voltage droop at the cache, while maintaining a clock signal supplied to the processor core in an unstretched state because no voltage droop has been detected at the processor core.

Figure 2:
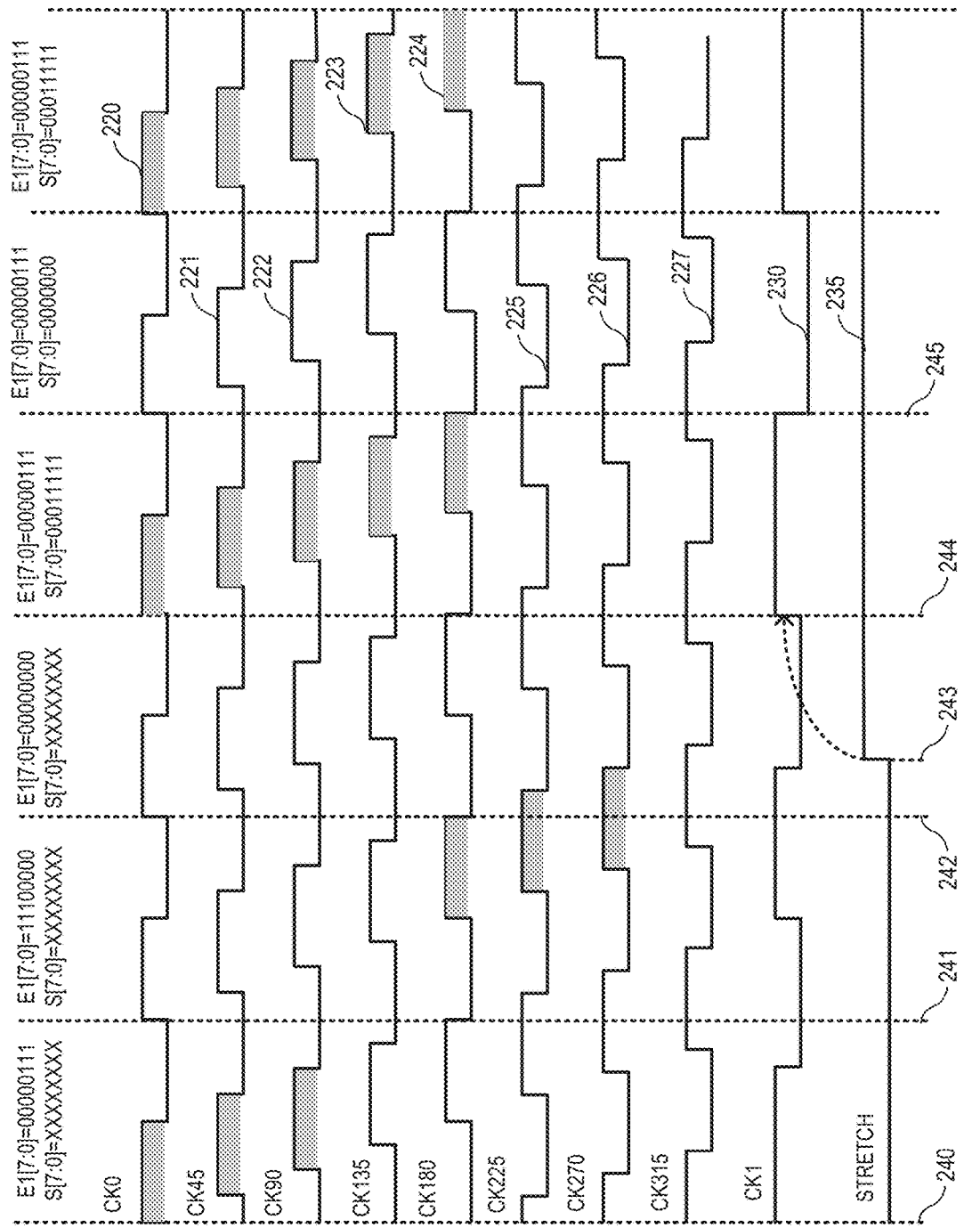
FIG. 2 is a diagram illustrating an example of adjusting a clock signal at the processor of FIG. 1 by adjusting enable signals used to generate the clock signal in accordance with some embodiments.

FIG. 2 illustrates a diagram 200 depicting an example operation of the clock generator 110 in accordance with some embodiments. In the depicted example, the diagram 200 illustrates waveforms 220-227, each corresponding to a different one of the base clock signals C0-C315. Thus, for example, waveform 220 represents the base clock signal C0, while waveform 221 represents the base clock signal C45. In addition, diagram 200 illustrates waveform 230, representing the clock signal CK1, and waveform 235, representing the signal STRETCH.

In the illustrated example, between a time 240 and a subsequent time 243, the STRETCH signal is in a negated state, indicating that no voltage droop has been detected at the processor core 102. Accordingly, between time 240 and time 244, the frequency of the clock signal CK1 is controlled by the enable signals E1[7:0] generated by the clock control module 104. In particular, for a first period of the base clock signal CK180, between time 240 and a time 241, the clock control module 104 sets the E1[7:0] enable signals to the value 00000111. In response, between time 240 and time 241, the clock generator 110 generates the CK1 clock signal as the logical "OR" combination of the base clock signals CK0, CK45, and CK90. For the subsequent period of the base clock signal CK180, between time 241 and a time 243 the clock control module 104 sets the E1[7:0] enable signals to the value 11100000. In response, the clock generator 110 generates the CK1 clock signal as the logical "OR" combination of the base clock signals CK180, CK225, and CK270. For the next period of the base clock signal CK180, between time 242 and time 244, the clock control module 104 sets the E1[7:0] enable signals to the value 00000000, so that the CK1 clock signal is negated.

The net effect of the enable signals E1[7:0] as generated by the clock control module 104 between times 240 and 244 is to cause the clock generator 110 to generate the CK1 clock signal to have a frequency equal to the frequency of the base clock signals divided by 1.75. Thus, when the STRETCH signal is negated, the clock generator 110 operates as a frequency divider, wherein it generates the CK1 clock to have a frequency equal to the frequency of the base clock signals divided by a divisor, with the divisor set by the sequence of enable signals generated by the clock generator 110. The clock generator 110 can adjust the divisor by adjusting the sequence of enable signals, in order to set the CK1 clock signal to a frequency indicated by the DVFS module 115 (FIG. 1).

In the depicted example of FIG. 2, at time 243 the STRETCH signal is asserted, indicating that the voltage detector 103 (FIG. 1) has detected a voltage droop at the processor core 102. In response, at the beginning of the next period of the base clock signal CK180 (i.e., at time 244) the clock generator 110 stops employing the E1[7:0] enable signals to generate the clock signal CK1, and begins using the stretch enable signals S[7:0]. Further, the stretch control module 107 generates the stretch enable signals S[7:0] to reduce the frequency of the clock signal CK1 relative to its frequency prior to time 244, thereby adjusting for the voltage droop.

To illustrate, during the period of the base clock signal CK180 between time 244 and a time 245, the stretch control module 107 generates the stretch enable signals S[7:0] to have a value of 00011111. In response, between time 244 and time 245, the clock generator 110 generates the CK1 clock signal as the logical "OR" combination of the base clock signals CK0, CK45, CK90, CK135, and CK180. For the subsequent period of the base clock signal CK180 that follows time 245, the stretch control module 107 generates the stretch enable signals S[7:0] to have a value of 00000000, thereby causing the clock generator 110 to negate the clock signal CK1 for this period of the base clock signal 180. For subsequent periods of the base clock signal CK180 (not shown at FIG. 2) while the STRETCH signal is asserted, the stretch control module 107 alternates the value of the stretch enable signals S[7:0] between 00011111 and 0000000. This sequencing of values for the stretch enable signals results in the clock generator 110 generating the clock signal CK1 to have a frequency that is half of the frequency of the base clock signals. That is, the sequence of values for the stretch enable signals S[7:0] establishes the divisor for the clock generator 110 to have a value of two.

In the depicted example, the clock control module 104 continues to generate values for the enable signals E1[7:0] while the STRETCH signal is asserted. That is, the clock control module 104 generates the enable signals E1[7:0] independently of the state of the STRETCH signal. This allows the processor 100 to quickly switch between clock frequencies, in response to the initiation or cessation of voltage droop, by switching which enable signals are employed by the clock generator 110 to generate the clock signal CK1. Further, it allows the clock generator 110 to synchronize any change in frequency with a period of the clock signal CK1, thereby allowing the processor core 102 to continue operation during the change in frequency. This can improve processing and power efficiency relative to conventional designs that would require the processor core 102 to suspend operations while the frequency of its clock signals are changed in response to initiation or cessation of a voltage droop.

In some embodiments, rather than changing the period of the clock signal CK1 at a rising edge of the clock signal in response to assertion of the STRETCH signal, the clock generator 110 can change the period at a falling edge of the clock signal CK1, so that the first stretched phase of the clock signal CK1 is during a negated phase. For some processors, changing the period of the clock signal during a falling edge can allow the clock generator 110 to begin the stretched period of the clock signal CK1 more quickly, thereby saving additional power.

In addition, in some embodiments when the STRETCH signal is negated, the stretch control module 107 provides the S[7:0] signals that are phase-aligned with the clock signal CK1. Similarly, when the STRETCH signal is asserted, the clock control module 104 provides the E1[7:0] signals as phase-aligned signals to the stretched clock signal CK1. By phase aligning the S[7:0] signals and E1[7:0] signals to the clock signal CK1 (when unstretched and stretched, respectively), the period of the clock signal CK1 can transition at a clock edge, thereby reducing errors resulting from the change in the clock signal CK1.

Figure 3:
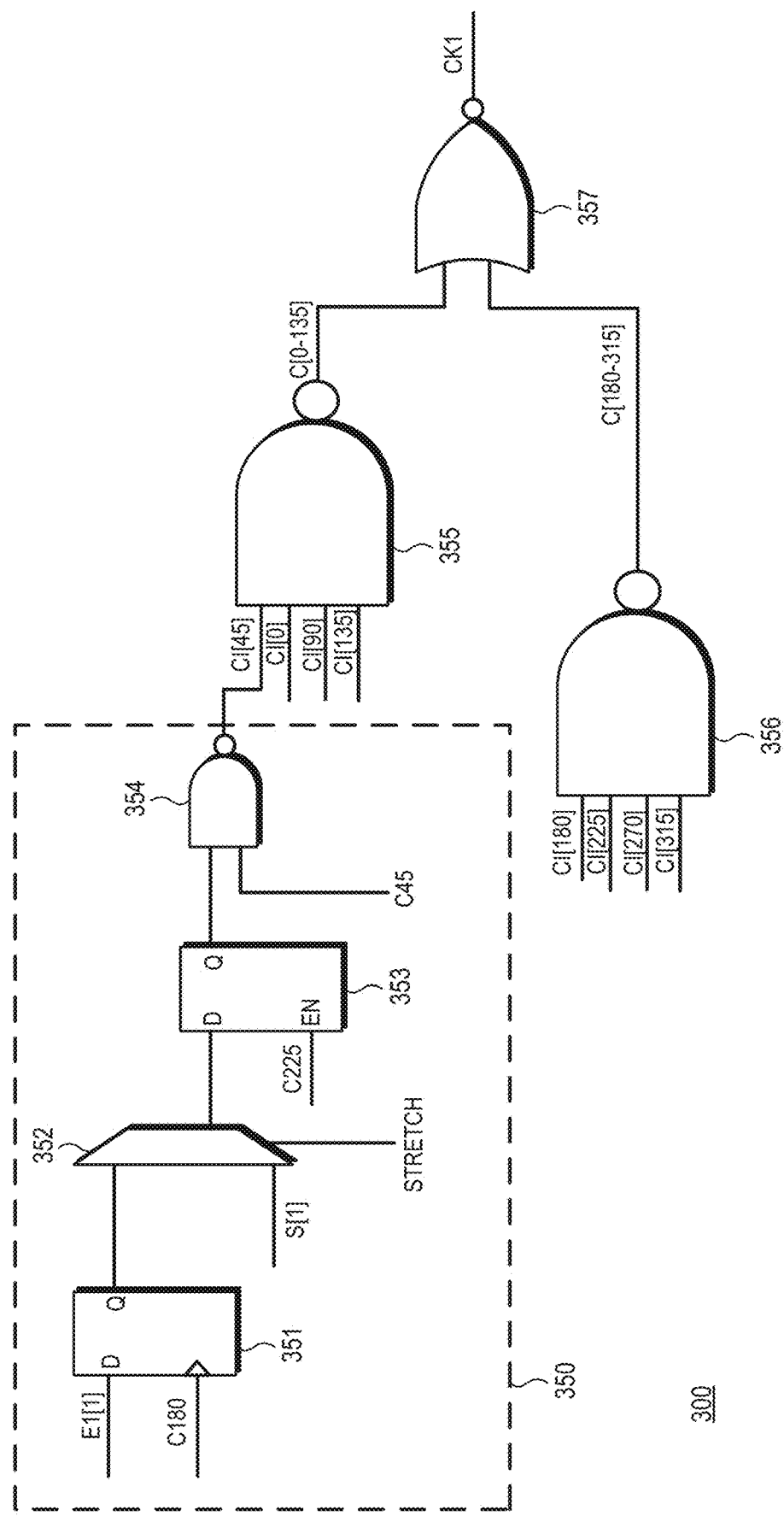
FIG. 3 is a block diagram illustrating a portion of a clock generator of the processor of FIG. 1 in accordance with some embodiments.

FIG. 3 illustrates a block diagram of a portion 300 of the clock generator 110 in accordance with some embodiments. The portion 300 includes a clock sub-circuit 350, NAND gate 355 and 356, and a NOR gate 357. The sub-circuit 350 includes a latch 351, a multiplexer 352, a latch 353, and a NAND gate 354. The latch 351 includes a data input to receive the enable signal E1[1], a clock input to receive the base clock signal C180, and an output. The multiplexer 352 includes a data input connected to the output of the latch 351, a data input to receive the stretch enable signal S[1], and a control input to receive the STRETCH signal, and an output. The latch 353 includes a data input connected to the output of the multiplexer 352, an enable input to receive the base clock signal C225, and an output. The NAND gate 354 includes an input connected to the output of the latch 353, an input to receive the clock signal C45, and an output.

In operation, the sub-circuit 350 is generally configured to select one of the enable signal E1[1] or the stretch enable signal S[1] as the applicable enable signal for the sub-circuit 350, and to select whether the base clock signal C45 is to be used to as one of the bases of the clock signal CK1. To illustrate, the latch 351 is generally configured to latch the value of the enable signal E1[1] in response to assertion of the base clock signal C180. The multiplexer 352 is configured to select the applicable enable signal based on the state of the STRETCH signal. In particular, in response to the STRETCH signal being negated, the multiplexer 352 applies the output of the latch 351 at its output. Therefore, if the STRETCH signal is negated, the latched value of the enable signal E1[1] is applied to the input of the latch 353. In contrast, if the STRETCH signal is asserted, the multiplexer 352 applies the stretch enable signal S[1] to the input of the latch 353.

The NAND gate 354 is configured to selectively apply the base clock signal C45 at its output based on the state of the applicable enable signal as latched at the latch 353. Thus, if the value of the latched applicable enable signal is negated, indicating the base clock signal C45 is not to be used as a basis of the CK1 clock signal, the NAND gate 354 maintains its output in an asserted state. If the value of the latched applicable enable signal is asserted, the output of the NAND gate will be an inverted representation of the base clock signal C45.

The clock generator 110 includes additional sub-circuits similar to the sub-circuit 350 and are not illustrated at the portion 300 for clarity. In particular, the clock generator 110 includes a corresponding sub-circuit for each base clock signal C0-C315, with each sub-circuit receiving a different one of the enable signals E1[7:0] and a different corresponding one of the stretch enable signals S[7:0]. Each sub-circuit operates similarly to the sub-circuit 350 by selecting the applicable enable signal based on the state of the STRETCH signal, and by selecting, based on the state of the corresponding applicable enable signal, whether the corresponding clock signal is to be used as one of the bases of the clock signal CK1.

The NAND gate 355 includes a plurality of inputs each connected to a different one of the sub-circuits for the base clock signals C0, C45, C90, and C135, and an output. The NAND gate 356 includes a plurality of inputs each connected to a different one of the sub-circuits for the base clock signals C180, C225, C270, and C315. The NOR gate 357 includes an input connected to the output of the NAND gate 355, an input connected to the output of the NAND gate 356, and an output to provide the clock signal CK1. Based on the configuration and connections of the sub-circuits (e.g., sub-circuit 350), the NAND gates 355 and 356, and the NOR gate 357, the CK1 clock signal is generated based on the state of the applicable enable signals, as indicated by the state of the STRETCH signal, and based on the base clock signals selected by the applicable enable signals.

Figure 4:
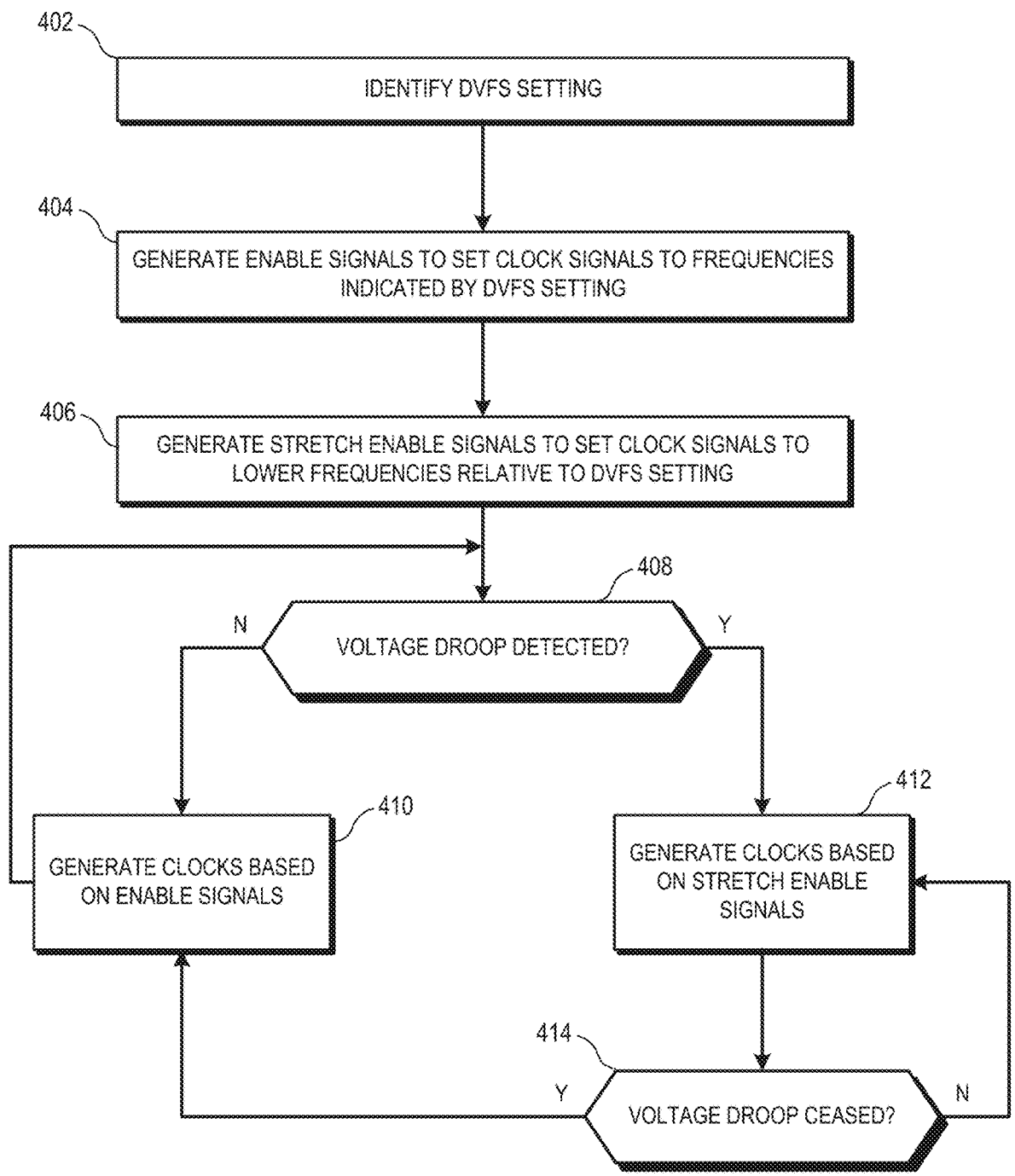
FIG. 4 is a flow diagram of a method of adjusting a clock signal at a processor in response to a voltage droop by adjusting enable signals used to generate the clock signal in accordance with some embodiments.

FIG. 4 illustrates a flow diagram of a method 400 of adjusting a frequency of a clock signal in response to detecting a voltage droop at a processor core in accordance with at least one embodiment. For purposes of description, the method 400 is described with respect to an example implementation at the processor 100 of FIG. 1. At block 402, the clock control module 104 identifies, based on information received from the DVFS module 115, the nominal frequency setting for the clock signals CK1 and CK2. At block 404, the clock control module 104 generates the E2[7:0] and E1[7:0] enable signals to set the CK2 and CK1 clock signals to their respective nominal frequency settings. At block 406 the stretch control module 107 generates the stretch enable signals S[7:0] to set the CK1 and CK2 clock signals to a lower frequency relative to their nominal frequencies.

At block 408, the voltage detector 103 monitors the voltage at one or more points of the processor core 102 to identify whether a voltage droop is present. If not, the voltage detector 103 maintains the DROOP signal in a negated state and the stretch control module 107 in turn maintains the STRETCH signal in a negated state. In response, the method flow moves to block 410, and the clock generators 110 and 112 generate the CK2 and CK1 clock signals based on the E2[7:0] and E1[7:0] enable signals, thereby generating the clock signals at their respective nominal frequencies. The method flow then returns to block 408 as the voltage detector 103 continues to monitor the voltage at the processor core 102.

Returning to block 408, in response to detecting a voltage droop the voltage detector 103 asserts the DROOP signal, thereby causing the stretch control module 107 to assert the STRETCH signal. In response, the method flow moves to block 412 and the clock generators 110 and 112 generate the CK2 and CK1 clock signals based on the S[7:0] stretch enable signals, thus generating the clock signals at their slower frequencies. The method flow proceeds to block 414 and the voltage detector 103 monitors whether the voltage at the processor core 102 has returned to its nominal level or range. If not, the method returns to block 412 as the clock generators 110 and 112 maintain the CK2 and CK1 clock signals at their slower frequencies. If, at block 414, the voltage detector 103 identifies that the monitored voltage has returned to its nominal level or range, the method flow proceeds to block 410, where the stretch control module 107 negates the STRETCH signal, causing the clock generators 110 and 112 to return to generating the CK2 and CK1 clock signals based on the E2[7:0] and E1[7:0] enable signals.

In some embodiments, certain aspects of the techniques described above can implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to detecting a voltage drop at a processor, modifying a first set of enable signals provided from a clock control module to generate a modified first set of enable signals using a set of stretch enable signals provided from a stretch control module coupled directly to a voltage detection module and
   generating a first clock signal based on the modified first set of enable signals, wherein generating the first clock signal comprises:
      selecting a plurality of clock signals based on the modified first set of enable signals; and
      logically combining the selected plurality of clock signals to generate the first clock signal;
      modifying a second set of enable signals to generate a modified second set of enable signals, in response to detecting the voltage drop at the processor; and
      generating a second clock signal based on the modified second set of enable signals.

2. The method of claim 1, wherein modifying the first set of enable signals comprises:
   modifying the first set of enable signals to change a frequency of the first clock signal from a first frequency to a second frequency.

3. The method of claim 2, wherein the second frequency is less than the first frequency.

4. The method of claim 1, further comprising:
   after detecting the voltage drop at the processor, in response to detecting a voltage
   increase at the processor, modifying the modified first set of enable signals to generate a modified second set of enable signals; and
   generating the first clock signal based on the modified second set of enable signals.

5. The method of claim 1, wherein:
   generating the first clock signal comprises generating the first clock signal to have a first frequency; and generating the second clock signal comprises generating the second clock signal to have a second frequency different from the first frequency.

6. A method, comprising:
   generating a first set of enable signals at a clock control module;
   generating a first clock signal at a first frequency based on the first set of enable signals;
   providing the first clock signal at the first frequency to a processor; and
   in response to detecting a voltage drop at the processor, modifying the first set of enable signals using a set of stretch enable signals provided from a stretch control module coupled directly to a voltage detection module to change a frequency of the first clock signal from the first frequency to a second frequency, the second frequency different from the first frequency;
   generating a second set of enable signals;
   generating a second clock signal at a third frequency based on the second set of enable signals;
   providing the second clock signal at the second frequency to the processor; and
   in response to detecting the voltage drop at the processor, modifying the first set of enable signals to change a frequency of the second clock signal from the third frequency to a fourth frequency, the fourth frequency different from the third frequency.

7. The method of claim 6, further comprising:
   in response to detecting a voltage increase at the processor after the voltage drop, modifying the first set of enable signals to change the frequency of the first clock signal from the second frequency to the first frequency.

8. The method of claim 6, further comprising:
   in response to detecting a voltage increase at the processor after the voltage drop, modifying the first set of enable signals to change the frequency of the first clock signal from the second frequency to a third frequency, the third frequency different from the first frequency and from the second frequency.

9. The method of claim 6, further comprising: providing the first clock signal to a cache associated with the processor.

10. The method of claim 6, wherein generating the first clock signal comprises:
    selecting, based on the first set of enable signals, a subset of clock signals from a plurality of clock signal; and
    combining the selected plurality of clock signals to generate the first clock signal.

11. A processor comprising:
    a voltage detection module to detect a voltage drop at the processor;
    a first clock generation module to receive a first set of enable signals output by a clock control module and a first plurality of clock signals, the first clock module to generate a first clock signal based on the first set of enable signals from the clock control module and the plurality of clock signals; and
    a stretch control module coupled directly to the voltage detection module and coupled to the first clock module to modify the first set of enable signals in response to the voltage detection module indicating the voltage drop, wherein in order to modify the first set of enable signals, the stretch control module provides a set of stretch enable signals to an input of the first clock module;
    a second clock generation module to receive a second set of enable signals and the first plurality of clock signals, the second clock generation module to generate a second clock signal based on the second set of enable signals and the plurality of clock signals; and
    the stretch control module to modify the second set of enable signals in response to the voltage detection module indicating the voltage drop.

12. The processor of claim 11, wherein the stretch control module is to: modify the first set of enable signals to change a frequency of the first clock signal from a first frequency to a second frequency.

13. The processor of claim 12, wherein the second frequency is less than the first frequency.

14. The processor of claim 11, wherein the stretch control module is to:
   in response to the voltage detection module indicating an increase in the voltage at the processor, modifying the modified first set of enable signals to generate a modified second set of enable signals.

15. The processor of claim 11, wherein the first clock module is to:
   select a subset of the plurality of clock signals based on the first set of enable signals; and logically combine the selected plurality of clock signals to generate the first clock signal.

16. The processor of claim 11, wherein: the first clock module is to generate the first clock signal to have a first frequency; and
   the second clock module is to generate the second clock signal to have a second frequency different from the first frequency.

* * * * *